United States Patent [19]
Davis

[11] Patent Number: 5,797,975
[45] Date of Patent: Aug. 25, 1998

[54] FILTER FRAME

[76] Inventor: R. Matt Davis, Rte. 2, Box 103-C, Fairmont, N.C. 20187

[21] Appl. No.: 744,740

[22] Filed: Oct. 30, 1996

[51] Int. Cl.⁶ .................................................. B01D 46/00
[52] U.S. Cl. ............................ 55/493; 55/483; 55/491; 55/492; 55/511
[58] Field of Search .............................. 55/350.1, 482, 55/483, 484, 490, 492, 491, 494, 493, 511, DIG. 31

[56] References Cited

U.S. PATENT DOCUMENTS

| | | | |
|---|---|---|---|
| 3,047,994 | 8/1962 | Le Brun | 55/493 |
| 3,280,984 | 10/1966 | Sexton et al. | 55/491 |
| 5,421,862 | 6/1995 | Davis | 55/491 |

FOREIGN PATENT DOCUMENTS 1448425  6/1966  France ................................. 55/493

Primary Examiner—Jay H. Woo
Assistant Examiner—Minh-Chau T. Pham
Attorney, Agent, or Firm—Rhodes, Coats & Bennett, L.L.P.

[57] ABSTRACT

A filter frame that includes a hinge structure for coupling a series of like filter frames together such that the series of filter frames may be folded together. Moreover, the filter frame includes a series of separable sub-sections that correspond to standard filter sizes. This enables an original filter frame to be "broken down" to a number of smaller standard sizes.

12 Claims, 6 Drawing Sheets

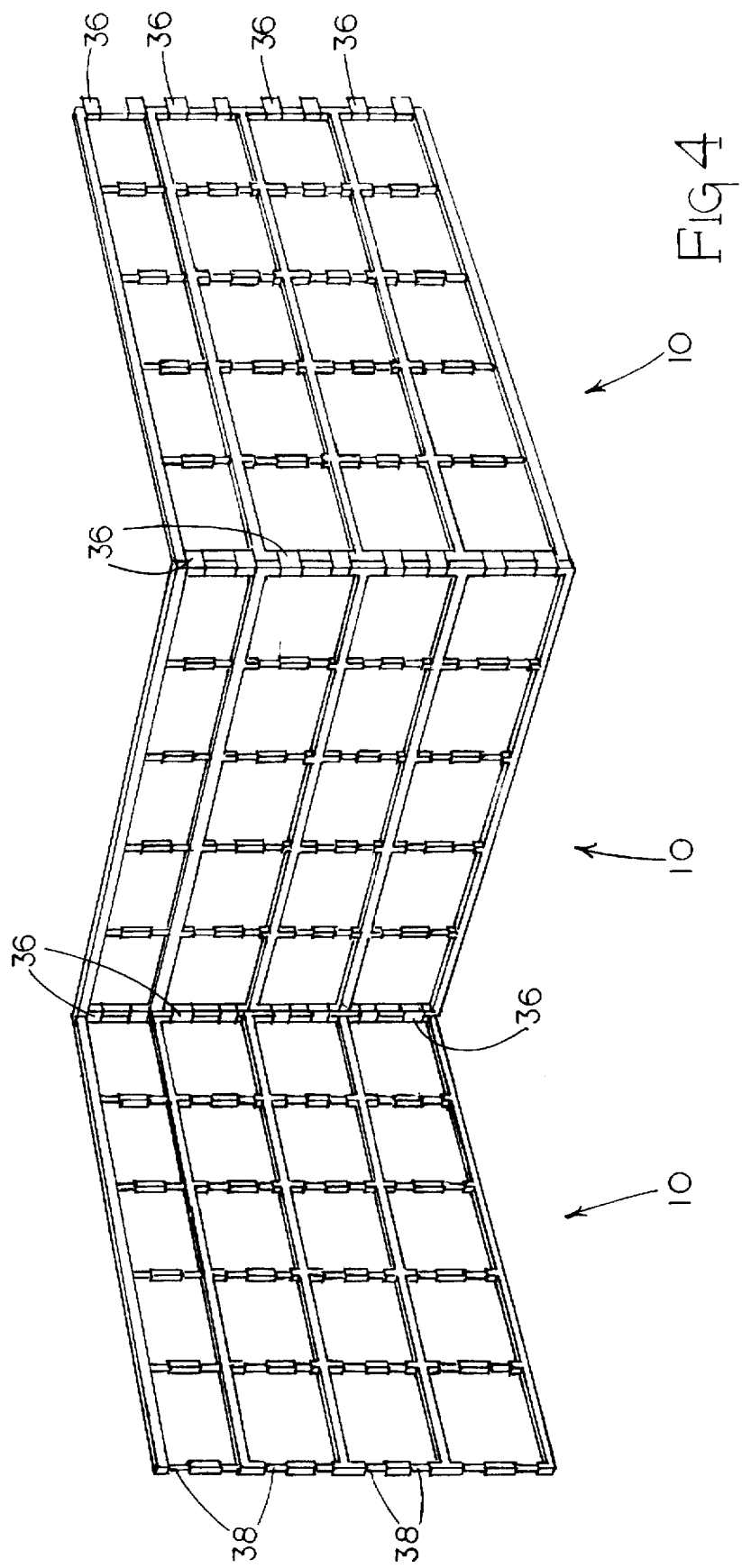

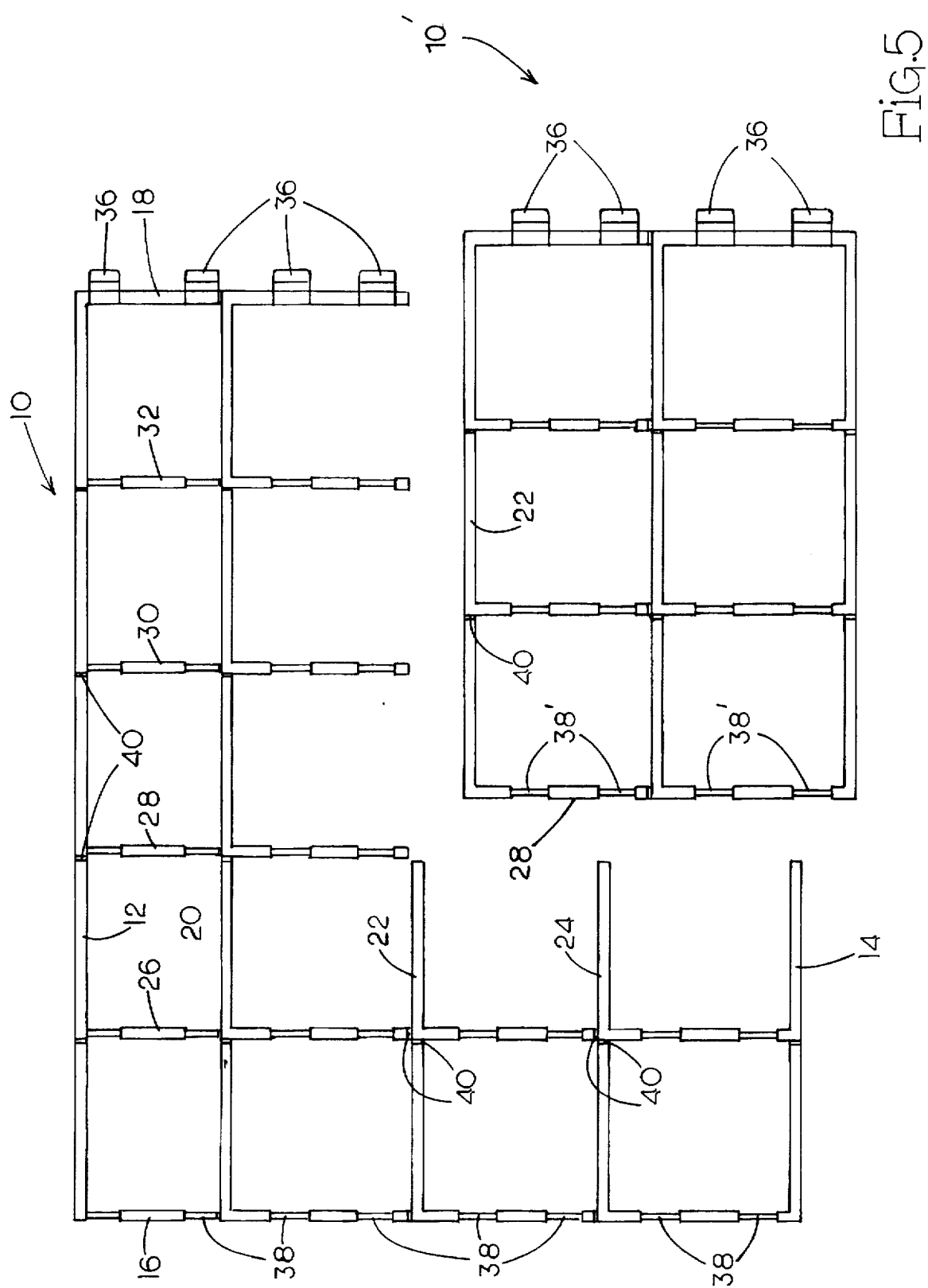

FILTER FRAME

FIELD OF INVENTION

The present invention relates to filter frames and more particularly to a filter frame designed to accept a disposable filter mat, a more particularly to a filter frame that can be coupled to a like filter frame and can be broken down into various standard filter frame sizes.

BACKGROUND OF THE INVENTION

There has long been a need for a reliable and cost-effective replacement filter for both residential and commercial applications. Filters typically used in HVAC systems obviously have a limited life. Once that life is reached, the entire filter assembly, including the frame and the filter media, is discarded. However, only the filter media has reached the end of its useful life as the frame, in most instances, remains sturdy and rigid. In light of this, the present inventor developed a filter frame having a replaceable filter mat or media. See the disclosure found in U.S. Pat. No. 5,421,862. This patent discloses a permanent filter frame that is designed to accept and support replacement filter mats on a long term basis. Thus, a homeowner using this system, simply has to replace the filter mat at a cost that is substantially below the cost of a conventional filter frame assembly Another factor affecting the consumer's cost for an HVAC filter is the fact that there are many standard filter sizes. In providing consumers with filter assemblies or filter frames for a variety of sizes, there is substantial expense incurred in tooling and producing a separate filter frame for each and every standard filter size. This cost could be reduced by providing a filter frame or filter assembly that could be conveniently and easily altered so that one original filter frame or filter assembly structure could be utilized to form any number of standard size filter frames or filter frame assemblies.

Filter frames with replaceable filter mats can have application in commercial and industrial applications. Typically, in commercial and industrial applications, the filter assemblies are often inserted within a track or rail structure in edge-to-edge relationship. One of the problems that HVAC technicians experience is a problem relating to handling stacks of filter frames before and after they are placed within a commercial or industrial application. In particular, the filter frame assemblies are manufactured in individual panels and consequently, the technician is required to handle and carry the individual filter assemblies from a service truck to an installation station which can be located atop a high-rise office building. This chore is very cumbersome. Therefore, there is a need for a commercial and industrial filter assembly that is easy to handle.

SUMMARY AND OBJECTS OF THE INVENTION

The present invention entails a filter frame or filter assembly having a coupling or hinge structure formed thereon. The coupling or hinge structure allows one filter frame to be coupled and connected to one or more of a series of like filter frames to form a coupled filter frame assembly. The respective filter frames that comprise the assembly may be folded together in back-to-back relationship for purposes of storing or transport. In addition, the filter frame of the present invention is designed such that it can be broken down into smaller filter frames that correspond to standard sizes.

More particularly, the filter frame of the present invention includes a grid structure that is designed to support a standard or conventional filter media or a replaceable filter mat of the type discussed above. The filter frame includes a series of surrounding edges. Projecting from one edge is a plurality of laterally spaced hinge arms or holders. Formed on another edge of the filter frame is a series of hinge pins that are designed to be inserted into a hinge arm or holder of another filter frame. Thus, one filter frame can be coupled to another filter frame and the two filter frames may be moved or folded with respect to each other via the formed hinged structure.

In another embodiment of the present invention, the filter frame basically includes an initial size area. However, the filter frame is designed with break points or break lines such that a sub-section of the entire filter frame can be separated from the original filter frame so as to form a filter frame structure that is smaller in effective area than the original filter frame. These separation points or lines are particularly configured and spaced so as to conform to standard filter sizes.

It is therefore an object of the present invention to provide a filter frame structure that includes one or more sub-sections that can be separated from the filter frame structure to form smaller filter frames.

Another object of the present invention is to provide a filter frame that includes a coupling or hinge structure that allows a series of filter frames to be coupled together to form an assembly of filter frames.

Other objects and advantages of the present invention will become apparent and obvious from a study of the following description and the accompanying drawings which are merely illustrative of such invention.

BRIEF DESCRIPTION OF THE DRAWINGS

FIG. 4 is a perspective view showing a series of filter frames coupled together to from a filter frame assembly.

FIG. 5 illustrates the filter frame of the present invention being "broken down" to form a smaller size filter frame.

DETAILED DESCRIPTION OF THE INVENTION

Figure 1:
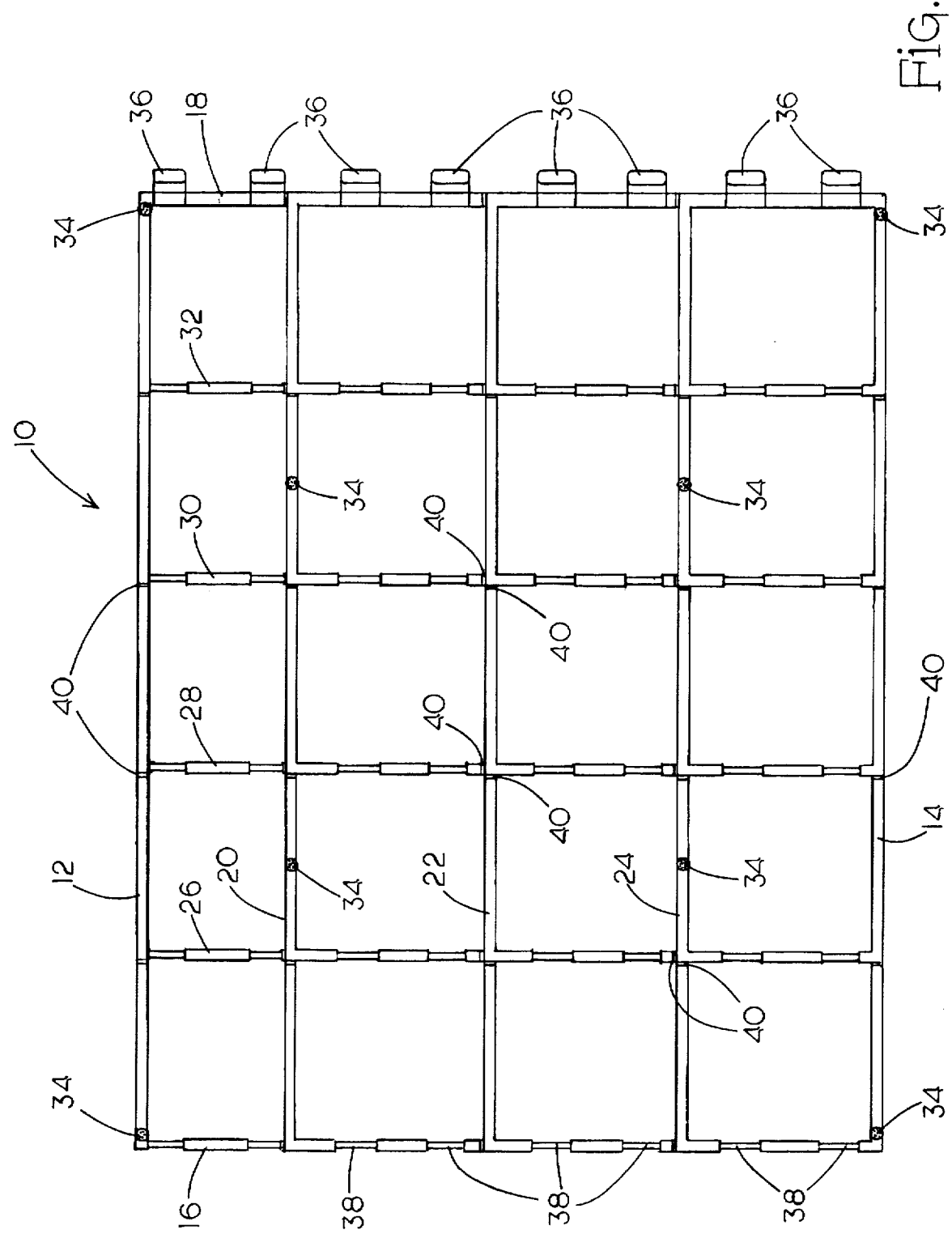
FIG. 1 is a side elevational view of the filter frame of the present invention.
Figure 2:
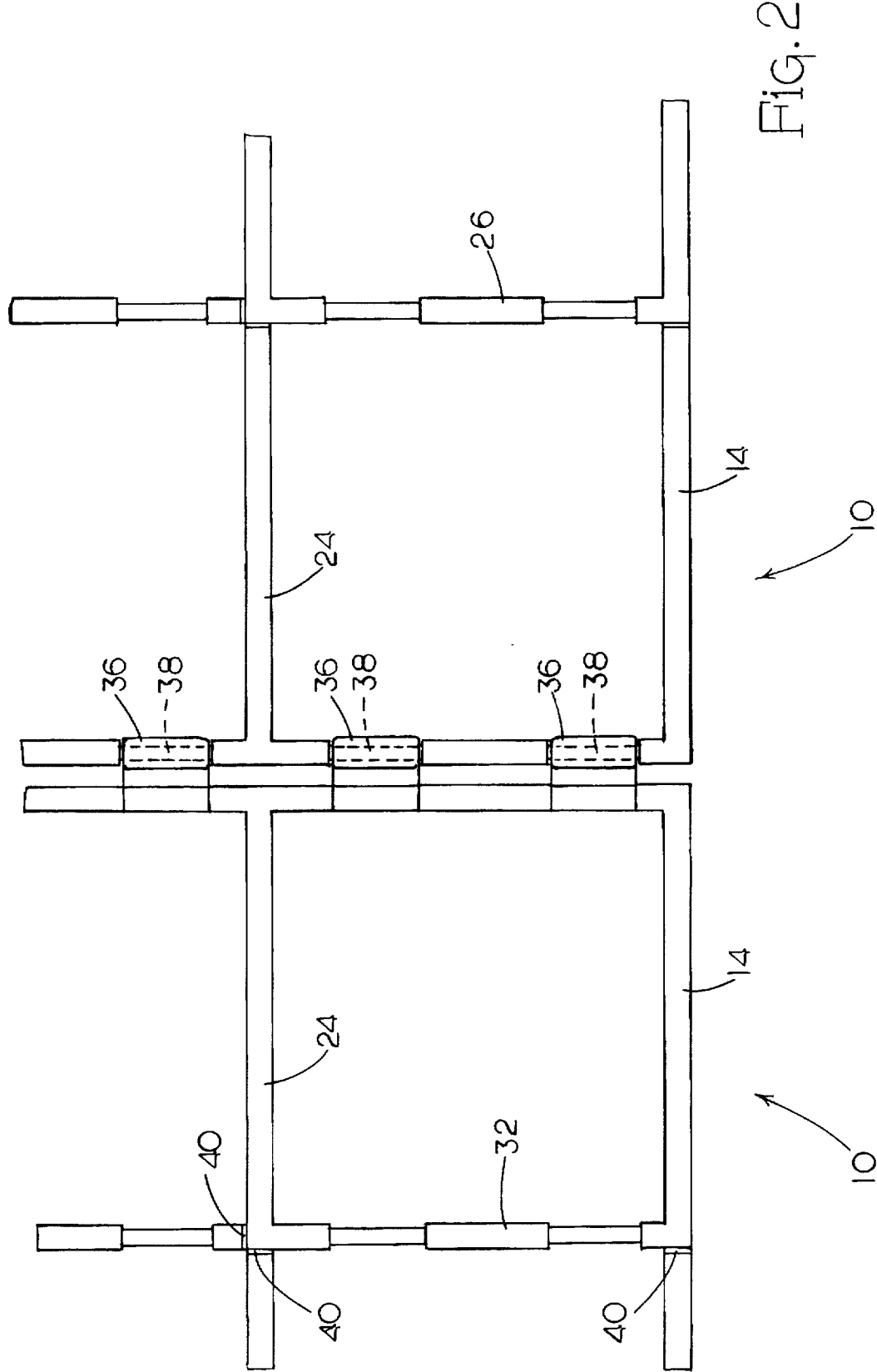
FIG. 2 is an enlarged side elevational view of a portion of two filter frames coupled together.

With further reference to the drawings, the filter frame of the present invention is shown therein and indicated generally by the numeral 10. Filter frame 10 comprises a basic grid structure that is made up of a series of elongated members that intersect at generally right angles. Various types of materials may be employed for the manufacture of filter frame 10 but it is contemplated that one suitable construction would be of molded plastic.

Viewing the filter frame 10 and its grid structure in more detail, it is seen that the same includes an upper edge strip 12 and a lower edge strip 14. Joining the upper and lower strips 12 and 14 are two outer side edge strips 16 and 18. In addition, the grid structure of the filter frame comprises a series of transverse members 20, 22 and 24. Transverse members 20, 22 and 24 are intersected by a series of vertical members 26, 28, 30 and 32. It is appreciated that the number of transverse and vertical members could vary depending on the overall size or effected area of the filter frame 10.

In the case of the embodiment illustrated herein, the filter frame 10 is designed to accept and support a replaceable filter mat or media such as that disclosed in U.S. Pat. No. 5,421,862, the disclosure thereof being expressly incorporated herein by reference. To secure such a replaceable and disposable filter mat to the filter frame 10, certain portions of the grid structure are provided with a "Velcro" type fastener 34 that is readily attachable to the filter media that comprises the replaceable mat. For example, the fastening structure 34 disposed on the grid structure may comprise hook-type fasteners or any other type of fastening structure that would project into the filter mat and effectively secure the mat adjacent the grid structure of the filter frame 10.

Filter frame 10 includes a coupling or hinge structure that permits the filter frame itself to be coupled to a like filter frame. In the case of the embodiment disclosed herein, the coupling or hinged structure comprises a series of hinge arms or holders indicated by the numeral 36. Hinge arms 36 are spaced apart and secured to the filter frame 10 in such a way that they project outwardly from an edge of the filter frame. In the embodiment illustrated in the drawings, hinge arms 36 are integral with the side edge 18 and project therefrom in spaced apart relationship.

Figure 3:
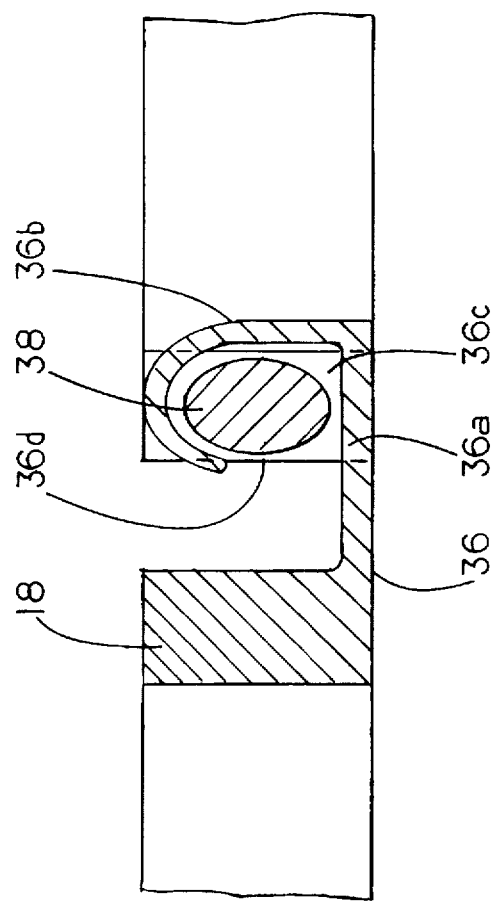
FIG. 3 is a fragmentary cross-sectional view illustrating the structure for connecting one filter frame to another filter frame.

Viewing the structure of the hinge arm 36, reference is made to FIG. 3. Therein, it is seen that the hinge arm 36 includes an arm 36a that projects outwardly from the side edge 18. About the terminal end portion of the arm 36a there is formed a finger 36b that extends from the arm 36a at approximately a right angle. Finger 36b extends upwardly as viewed in FIG. 3 and about an intermediate portion thereof begins to assume a curled or arcuate shape. Finger 36b defines an open insert cavity 36c that is bound in part by the finger 36b and arm 36a. Defined between the terminal end of the finger 36b and the arm 36a is an open entry way referred to by the numeral 36d.

Disposed along the opposite side edge 16 of the grid structure is a series of hinge pins 38. Hinge pins 38 form a part of side edge 16. In particular, the respective hinge pins 38 assume a curved or arcuate shaped cross-sectional area. This is particularly illustrated in FIG. 3. More particularly, the hinge pins 38, in the embodiment illustrated, are somewhat elongated. Hinge pins 38 are particularly sized and shaped such that they can be snapped into the cavity 36c of a respective hinge arm 36. This means, of course, that the cross-sectional area of the hinge pins 38 is particularly designed such that they can be generally retained within the cavity 36a for purposes of coupling two adjoining filter frames 10 together. However, the same hinge pin is designed such that it can be snapped into and snapped out of the cavity 36c.

Figure 3A:
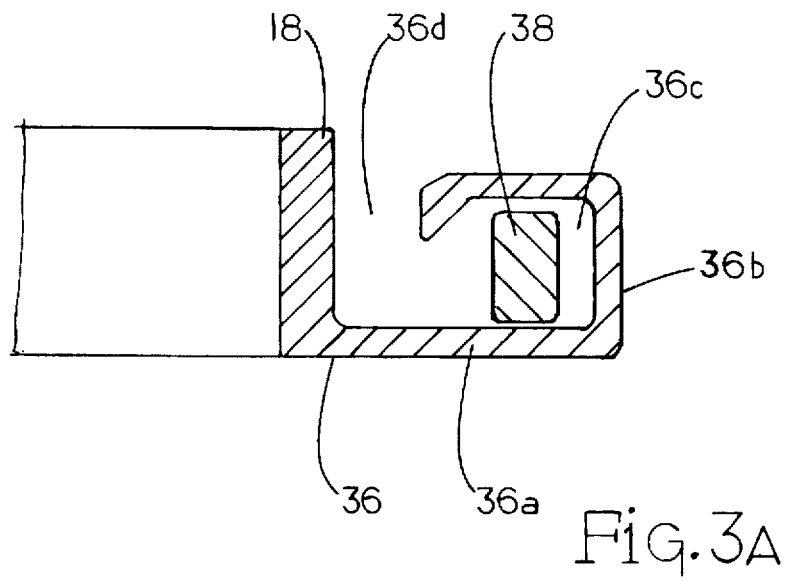
FIG. 3a is a fragmentary cross-sectional view illustrating another embodiment for the structure for connecting one filter frame to another filter frame.
Figure 3B:
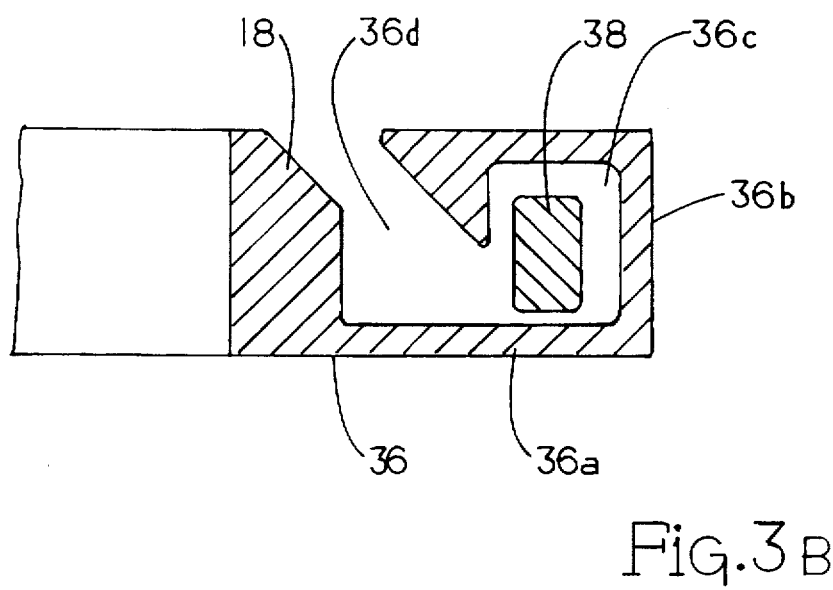
FIG. 3b is a fragmentary cross-sectional view illustrating yet another embodiment for the structure for connecting one filter frame to another filter frame.

Now, turning to FIGS. 3a and 3b, there is shown therein two alternative embodiments for hinging one filter frame to another filter frame. First, with respect to FIG. 3a, note that the hinge arm 36a and the finger 36b form a cavity 36c that is larger than the cavity 36c of the embodiment shown in FIG. 3. Thus, there is more area for the hinge pin 38 to move within cavity 36c of this embodiment. Like the hinge structure discussed above, between the terminal end of the finger 36c and member 18 there is provided a throughway 36d that allows the hinge pin 38 to be snapped therethrough. Now, viewing the alternative embodiment shown in FIG. 3b, the hinge arm 36a and integrally formed finger 36b form a generally enlarged rectangular cavity 36c. Note that the terminal end of the finger 36b assumes a generally hooked shape and defined between this hook shaped terminal end and an inclined portion of member 18 is an entry way 36d. The distance between the member 18 and the terminal end of the finger 36b is so sized with respect to the hinge pin 38 that the hinge pin 38 can be snapped into and out of the cavity 36c via the throughway 36d.

Filter frame 10 is designed such that it includes a series of sub-sections that can be separated from the filter frame as a whole to form filter frames of smaller effective areas. That is, the filter frame shown in FIG. 1 includes twenty quadrants. As will be appreciated from subsequent portions of this disclosure, a smaller section of quadrants can be separated from the main filter frame to produce a different size filter frame structure.

In the embodiment illustrated herein, this concept is carried out by selectively placing break points or lines 40 at various spaced locations throughout the entire grid structure. These break points 40 in the case of the embodiment illustrated herein, are simply scores or cuts formed in the respective members of the grid that enable the grid to be broken at these points. Note for example, at the juncture of members 28 and 22, there is provided two break points 40. In the design illustrated herein, a pair of break points 40 is provided adjacent all of the interior corners of the grid. The term "interior corners" refers to corners that lie inside the outer edges 12, 14, 16 and 18. In addition, there is provided a series of break points 40 along both the upper and lower members 12 and 14. Thus, it is appreciated that different size filter frames can be formed by simply selectively breaking the grid structure at selected break points 40.

FIG. 5 illustrates one example of the filter frame 10 being broken down to a smaller filter frame which in this case is indicated by the numeral 10'. Filter frame 10' includes six quadrants. Because of the particular break points, the upper edge of frame 10' becomes member 22. Member 28 becomes the left most edge, as viewed in FIG. 5, and includes hinge pins 38'. Thus, filter frame 10' shown in FIG. 5 becomes a smaller version of filter frame 10 shown in FIG. 1.

Filter frame 10 and the grid structure thereof is specifically designed such that the break points or intersection of the various grid members are strategically located so as to permit standard size filter frames to be separated from the overall filter frame 10. For example, in one case, the filter frame illustrated would have an overall base dimension of 25×24 inches. The break points 40 and grid structure can be designed such that filter frames of sizes 10×20 inches, 10×25 inches, 12×20 inches, 12×25 inches, 16×20 inches, and 16×25 inches, etc., could be formed from that overall main filter frame 10.

In use, a series of filter frames comprising frames of the type show in FIG. 1, can be coupled together to form a filter frame assembly of the type shown in FIG. 4. Note that the respective filter frames that comprise the assembly may be folded with respect to each other. This allows a series of filter frames 10 to be coupled and then folded in a zigzag or accordion style such that an entire array of filter frames can be compactly stored or held and at any appropriate time can be extended and installed into a filter holding station. Typically, the filter holding station includes a rack or rail structure and a series of filter frames 10 can be coupled together and simply inserted into a rack that would hold the same.

Also, it is appreciated that the filter frame 10 of the present invention is of a design that allows the overall grid structure to be broken or otherwise separated to form other filter frames and grid sizes of standard sizes. This, of course, enables a consumer to purchase a single filter frame and yet be in a position to make that filter frame fit a variety of duct or holding structure sizes. Thus, the filter frame 10 is of a design that permits the consumer to form filter frames of various sizes smaller than the overall filter frame.

The present invention may, of course, be carried out in other specific ways than those herein set forth without parting from the spirit and essential characteristics of the invention. The present embodiments are, therefore, to be considered in all respects as illustrative and not restrictive, and all changes coming within the meaning and equivalency range of the appended Claims are intended to be embraced therein.

What is claimed is:

1. A filter frame having at least one break-away filter frame smaller in size than the original filter frame, comprising: a filter frame for supporting a filter media thereon including a mainframe of a select area having multiple separable frame sections and wherein at least one of the separable frame sections includes an area smaller than the area of the mainframe; each separable frame section comprises a break-away construction that allows the frame section to be broken away from the mainframe and the mainframe including a grid structure having break-away lines formed therein by reducing the cross-sectional area of portions of the grid structure at selected points thereby allowing the mainframe to be broken along a selected break-away line.

2. The filter frame of claim 1 wherein a break-away line includes a series of break-away points, each break-away point being defined in the grid structure by a reduction in cross-sectional area along a portion of the grid structure.

3. The filter frame of claim 2 wherein the grid structure includes a series of elongated members that interconnect at generally right angles to form corners and wherein some break-away points are disposed adjacent respective corners of the grid structure.

4. The filter frame of claim 1 including fasteners disposed on the filter frame for detachably securing a disposable filter mat to the filter frame.

5. The filter frame of claim 1 wherein the filter frame includes a hinge structure for allowing the filter frame to be hinged to a frame such that the two hinged filter frames are folded with respect to each other.

6. The filter frame of claim 5 wherein the hinged structure formed on the filter frame includes male and female hinge connectors.

7. The filter frame of claim 6 wherein the filter frame includes a plurality of edges and wherein the male connectors project from one edge and the female connectors are disposed on another edge.

8. The filter frame of claim 5 wherein the hinge structure comprises a series of spaced apart holders formed on the filter frame and a series of spaced apart pins also formed on the filter frame and are inserted within the holders of another filter frame.

9. The filter frame of claim 8 wherein the holder includes a pin receiving cavity.

10. The filter frame of claim 9 wherein the pin receiving cavity includes an entry way that is particularly sized such that to insert the pin within the cavity the pin is snapped through the entry way and into the cavity.

11. The filter frame of claim 10 wherein the holder assumes a generally hooked shape and wherein the cavity is formed by curling the holder about an end portion thereof.

12. The filter frame of claim 5 wherein the filter frame includes a grid structure including a series of intersecting members and wherein certain intersecting members also include at least portions of a hinge structure that form a part of the hinge structure for a separable section.

* * * * *